(12) United States Patent
Yoshida

(10) Patent No.: US 6,292,256 B1
(45) Date of Patent: Sep. 18, 2001

(54) DISTANCE MEASUREMENT SYSTEM

(75) Inventor: Hideo Yoshida, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/401,948

(22) Filed: Sep. 23, 1999

(30) Foreign Application Priority Data

Sep. 29, 1998 (JP) .................................................. 10-275575

(51) Int. Cl.[7] .............................. G01C 3/00; G03B 13/00
(52) U.S. Cl. ........................... 356/3.04; 396/106; 396/120
(58) Field of Search ........................... 356/3.04; 396/120, 396/106

(56) References Cited

U.S. PATENT DOCUMENTS

| | | | |
|---|---|---|---|
| 5,652,926 | * 7/1997 | Saito | 396/106 |
| 5,659,387 | 8/1997 | Yoshida. | |
| 5,832,324 | * 11/1998 | Shimizu et al. | 396/106 |
| 6,026,246 | * 2/2000 | Yoshida et al. | 396/106 |

* cited by examiner

Primary Examiner—Stephen C. Buczinski
(74) Attorney, Agent, or Firm—Leydig, Voit & Mayer, Ltd.

(57) ABSTRACT

In a distance measurement mode, an autofocus integrated circuit is furnished with a power supply voltage and an integrating capacitor is preliminarily charged to a reference voltage $V_{REF}$. During the preliminary charging, an external luminance measured by a photometer is input into a CPU, together with a temperature measured by a temperature sensor. The CPU also checks power supply voltage. After the completion of the preliminary charging, an infrared emitting diode emits infrared pulses under the control of the CPU and an integrating capacitor is discharged by a voltage corresponding to distance to an object, a distance that is to be measured.

6 Claims, 4 Drawing Sheets

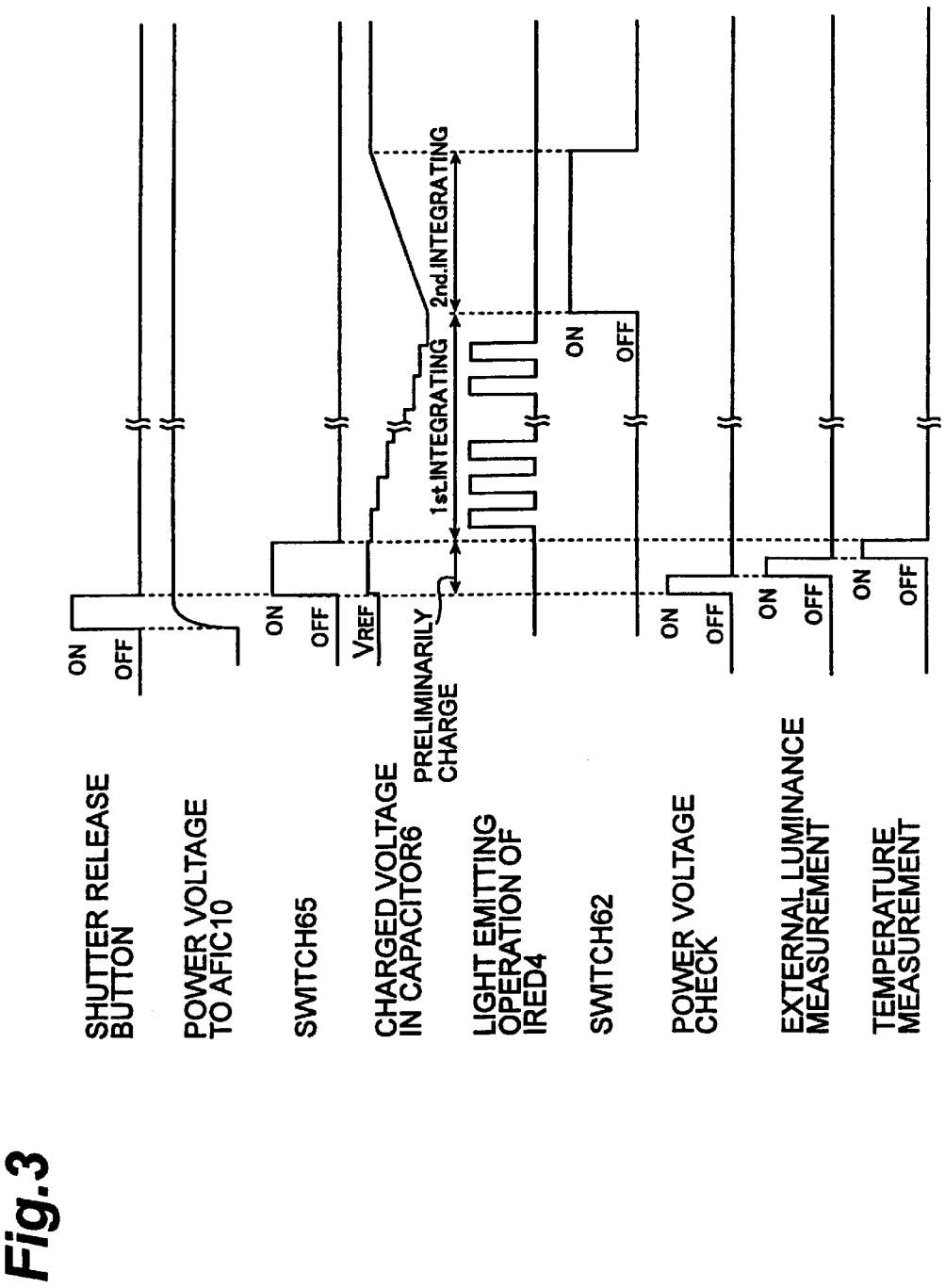

DISTANCE MEASUREMENT SYSTEM

BACKGROUND OF THE INVENTION

1. Field of the Invention

The present invention relates to a system for measuring a distance to an object to be measured and more particularly to an active distance measurement system favorably applied to various types of cameras.

2. Related Background Art

Such an active distance measurement system applied to cameras generally includes an infrared-emitting diode (IRED) for emitting an infrared beam toward an object to be measured, and a position sensitive detector (PSD) for receiving the object-reflected infrared beam. The signal output from the PSD is a signal responsive to a position where the object-reflected infrared beam is received. A signal processing and arithmetic unit determines a distance to the object to be measured from this signal. Because a large error may occur at once measurement, averaging of multiple pieces of distance information is generally performed to obtain more accurate distance information.

In the camera contained such an active distance measurement system, when a shutter release button is half depressed, a power source voltage check and an external luminance measurement are carried out. Then, the distance measurement system starts a distance measurement. Subsequently, the shutter release button is fully depressed, it allows a shutter to open for a certain period of time for exposure film to light.

SUMMARY OF THE INVENTION

However, the aforementioned prior distance measurement system requires a sensible time not only to average the multiple pieces of distance information, but also to perform the power source voltage check and the external luminance measurement previous to the distance measurement. Accordingly, there is a problem that a long time lag may occur until the time when the exposure film to light is actually performed after half-depressing of the shutter release button. In such a case, when it is desired to shoot such as a moving subject (object to be measured), a photograph having a desired composition may not be obtained.

In order to solve the above-mentioned problems, it is an object of the present invention to provide a distance measurement system, which can measure a distance to the object with a short time lag.

To achieve this object, the present invention supplies an active distance measurement comprising: (1) a light source for emitting a predetermined series of light pulses toward the object to be measured; (2) a position sensitive detector for receiving object-reflected light pulses and outputting signals each corresponding to a position where said object-reflected light pulse is received; (3) an arithmetic unit for outputting signals each corresponding to the distance to the object in response to the signals output from said position sensitive detector; (4) an integrating capacitor set to a first reference voltage before emitting said series of pulses, said capacitor being charged or discharged in response to said signals output from said arithmetic unit; (5) a distance detection unit for detecting the distance to the object based on a charged voltage of said capacitor present after emitting said series of pulses; (6) a measuring unit for performing a predetermined measuring operation; and (7) a control unit for controlling said distance measurement system so that a distance measurement is actually performed by emitting said series of light pulses after said measuring unit has performed the predetermined measuring operation during a predetermined period after instructions to start a distance measurement operation.

According to the present invention, the light source emits the light pulses toward the object and these pulses are reflected by the object. Each reflected pulse (object-reflected pulse) is detected by the position sensitive detector (PSD). The light-receiving position where the object-reflected pulse is received changes responsive to the distance to the object. The PSD outputs a signal dependent on this light-receiving position, it is possible to determine or calculate the light-receiving position and by extension the distance to the object based on thus output signal. The arithmetic unit issues the distance signals each representative of the distance to the object through the use of the above relation. The integrating capacitor integrates the distance signals and the distance detection unit can determine, based on the results of the integration, the average value of distance-calculation results for the corresponding pulse. As the number of pulses is known, the average of the distance signals corresponding to the series of pulses can be obtained based on the results of the integration. The predetermined measuring operation is carried out during the predetermined period after the start of the distance measurement operation and before the emissions of the pulses. When the system is applied to such as a camera, the time lag of the shutter operating can be shortened.

Preferably, the integrating capacitor is charged to the first reference voltage or higher during the aforementioned predetermined period. Where the system includes the stationary-light-component removal capacitor to remove the stationary-light component of the signal output from the position sensitive detector, it is favorable to set the stationary-light-component removal capacitor to the second reference voltage during the aforementioned predetermined period. The measuring unit may perform one or more of the functions such as the power source voltage check, the external luminance measurement, and the ambient temperature measurement.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a view showing various timing charts for explaining the operation of the distance measurement system of FIG. 1.

DESCRIPTION OF THE PREFERRED EMBODIMENTS

Figure 1:
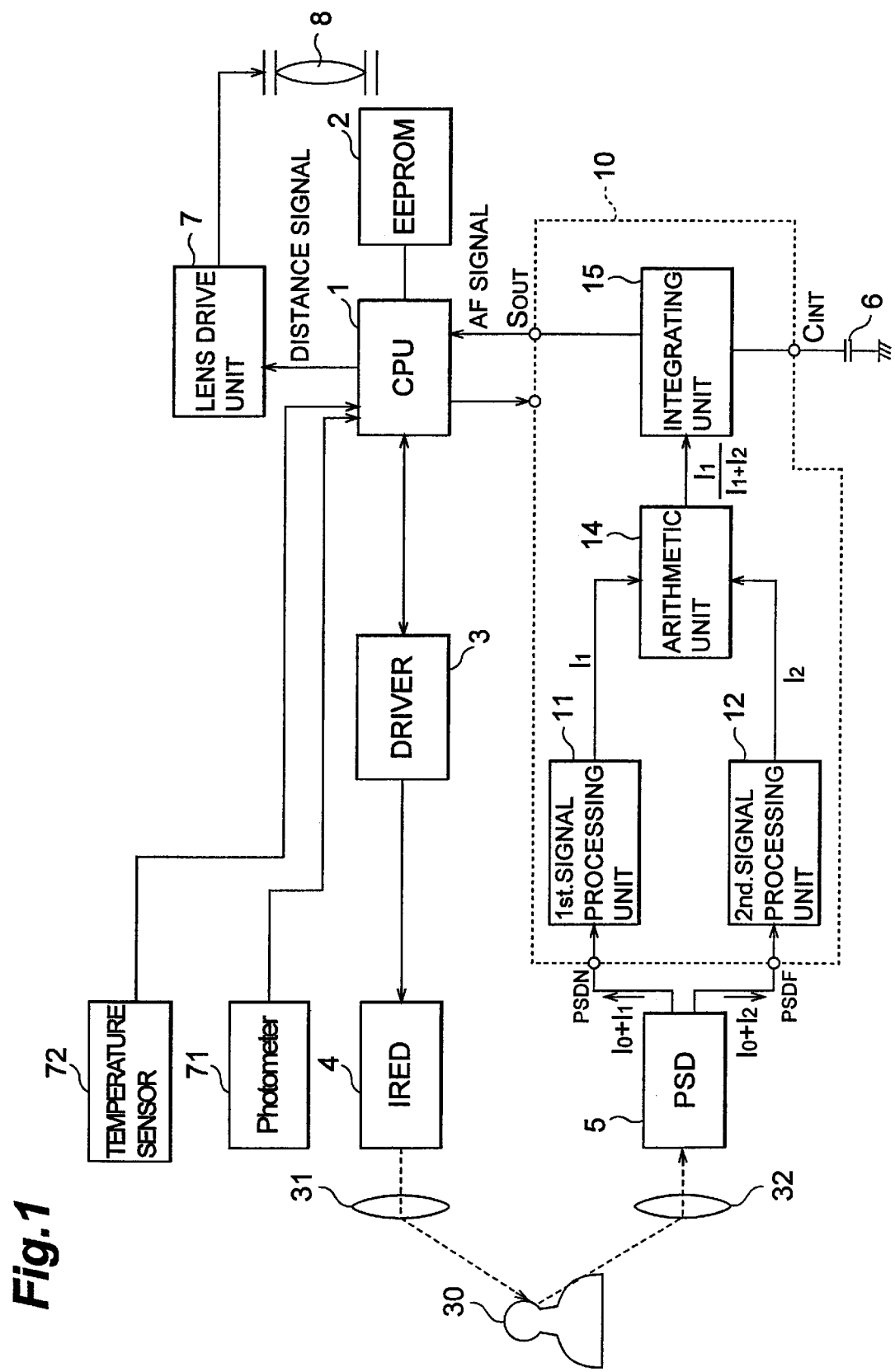
FIG. 1 is a block diagram showing a distance measurement system according to the preferred embodiment of the present invention.

The embodiments according to the invention will now be described in more detail with the accompanying drawings. To facilitate the comprehension of the explanation, the same reference numerals denote the same parts, where possible, throughout the drawings, and a repeated explanation will be omitted. Although the embodiments according to the present invention are described below regarding active distance measurement systems applied as those for using in automatic focussing cameras, the invention is certainly not limited thereto.

First, the whole configuration of the distance measurement system according to one embodiment of the present invention will be explained with FIG. 1.

A central processing unit (CPU) 1 controls the whole of a distance measurement system-mounting camera based on programs and parameters preliminarily stored in an electrically erasable and programmable read-only memory (EEPROM) 2. In the distance measurement system shown in this figure, the CPU 1 controls a driver 3 to bring the infrared pulse emission from an infrared emitting diode (IRED) 4 under control. Also, the CPU 1 controls the operation of an autofocus integrated circuit (AFIC) 10 and receives an AF signal output from the AFIC 10. Further input into the CPU 1 are signals, which represent respectively an external luminance measured by a photometer 71, ambient temperature measured by a temperature sensor 72, and a power source voltage. The CPU 1 checks or evaluates these signals.

The infrared pulses emitted by the IRED 4 are projected through a light-projecting lens 31, positioned in front of the IRED 4, toward the object to be measured 30. These infrared pulses are partially reflected by the object 30 and thus object-reflected pulses are received through a light-receiving lens 32, positioned in front of a position sensitive detector (PSD) 5, at a certain position on the light-receiving surface of the PSD 5. The light-receiving position is responsive to a distance to the object 30. The PSD 5 outputs two signals $I_1$ and $I_2$ in response to the light-receiving position. The signal $I_1$ is a "near-side" signal, which increases much more, the shorter the distance is if the received luminous energy is fixed, and the signal $I_2$ is a "far-side" signal, which increases much more, the longer the distance is if the received luminous energy is fixed. A sum of the signals $I_1$ and $I_2$ represents the luminous energy of the object-reflected pulse received by the PSD 5, and an output ratio $I_1/(I_1+I_2)$ represents a light-receiving position on the light-receiving surface of the PCD 5, that is, the distance to the object 30. The "near-side" signal $I_1$ is input to the PSDN terminal of the AFIC 10 and the "far-side" signal $I_2$ to the PSDF terminal of the AFIC 10. However, in fact, a stationary-light component $I_0$ dependent on exterior conditions may be added to each of the "near-side" signal $I_1$ and the "far-side" signal $I_2$, and the resultant signals are input into the AFIC 10.

The AFIC 10 is composed of first and second signal processing units 11 and 12, an arithmetic unit 14 and an integrating unit 15. The first signal processing unit 11 receives the signal $(I_1+I_0)$ output from the PSD 5 and outputs the "near-side" signal $I_1$ with the stationary-light component $I_0$ being removed therefrom. The second signal processing unit 12 receives the signal $(I_2+I_0)$ output from the PSD 5 and outputs the "far-side" signal $I_2$ with the stationary-light component $I_0$ being removed therefrom.

The arithmetic unit 14 receives the "near-side" signal $I_1$ output from the first signal processing unit 11 and the "far-side" signal $I_2$ output from the second signal processing unit 12 to calculate the output ratio $I_1/(I_1+I_2)$ and outputs an output ratio signal representing the results of the calculation. The integrating unit 15 receives the output ratio $I_1/(I_1+I_2)$ signal and, in corporation with an integrating capacitor 6 connected to the $C_{INT}$ terminal of the AFIC 10, integrates the output ratio multiple times to improve an S/N ratio. The integrated output ratio is output as an AF signal through the $S_{OUT}$ terminal of the AFIC 10. The CPU 1 receives the AF signal output from the AFIC 10 and converts it into a distance signal after the predetermined operation. The distance signal is transmitted to a lens drive unit 7, which causes a lens 8 to focus properly.

Figure 2:
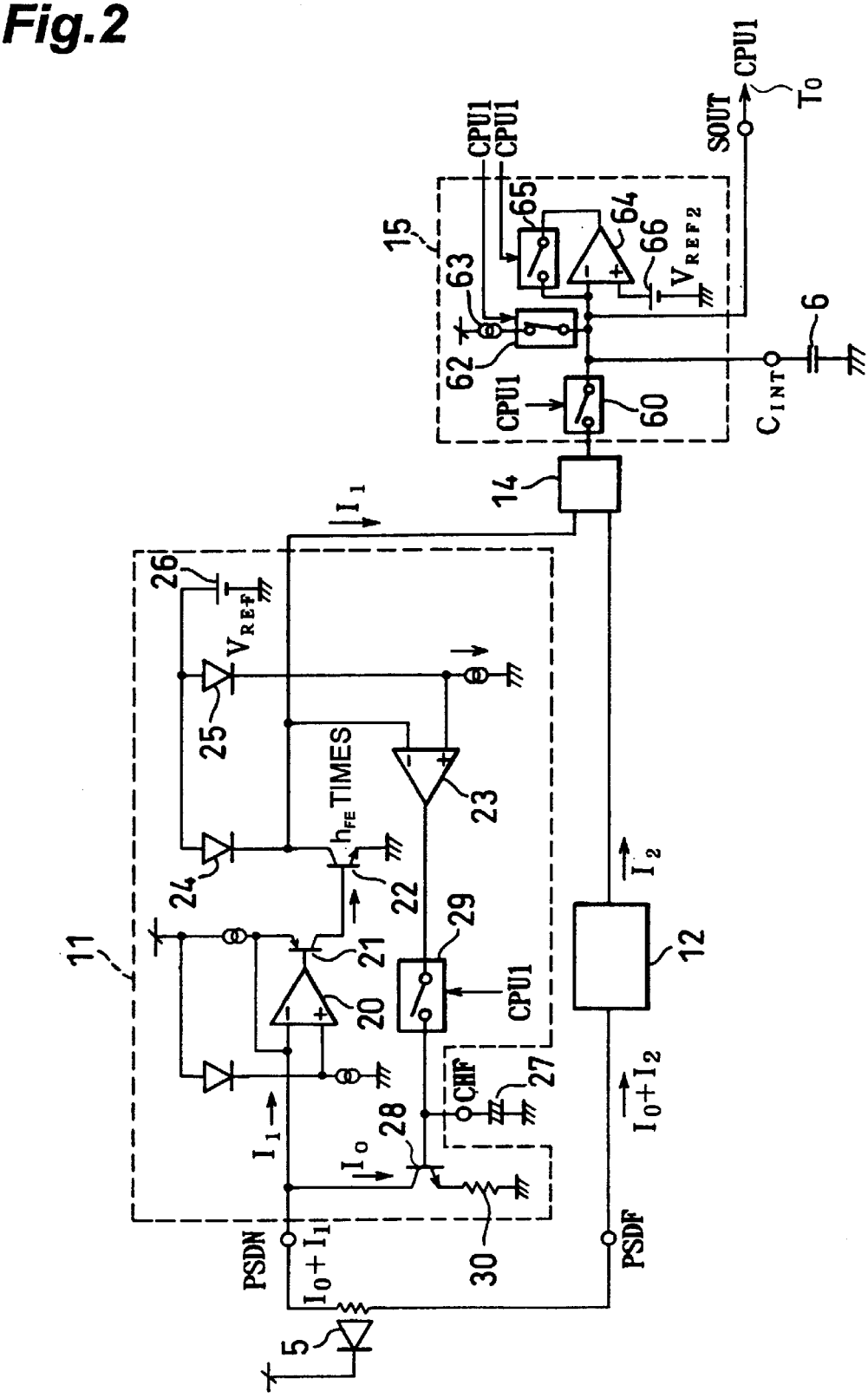
FIG. 2 is a circuit diagram showing a first signal processing unit and an integrating unit in the distance measurement system of FIG. 1.

The first signal processing unit 11 and the integrating unit 15 of the AFIC 10 will now be explained with respect to an illustrative circuit configuration thereof. FIG. 2 is a circuit diagram showing the first signal processing unit 11 and the integrating unit 15. It is to be noted that the second signal processing unit 12 may be of the same configuration as the first signal processing unit 11.

The first signal processing unit 11 is a circuit, which receives an input consisting of the stationary-light signal $I_0$ and the "near-side" signal $I_1$ output from the PSD 5 and which issues an output consisting of only the "near-side" signal $I_1$ with the stationary-light signal $I_0$ being removed therefrom. The current signal $(I_1+I_0)$ output from the "close distance-side" terminal of the PCD 5 is input through the PSDN terminal of the AFIC 10 to a negative (−) input terminal of an operational amplifier 20 in the first signal processing unit 11. An output terminal of the operational amplifier 20 is connected to a base terminal of a transistor 21, of which collector terminal is connected to a base terminal of a transistor 22. A collector terminal of the transistor 22 is connected not only to a negative input terminal of an operational amplifier 23, but also to the arithmetic unit 14. Furthermore, the collector terminal of the transistor 22 is connected to a cathode terminal of a logarithmic diode 24 and the positive (+) input terminal of the operational amplifier 23 is connected to a cathode terminal of a logarithmic diode 25. An anode terminal of each of the logarithmic diodes 24 and 25 is connected to a first reference power source 26.

Mounted externally to a CHF terminal of the AFIC 10 is a stationary-light-removal capacitor 27, which is connected to a base terminal of a stationary-light-removal transistor 28 in the first signal processing unit 11. The stationary-light-removal capacitor 27 and the operational amplifier 23 are connected together through a switch 29. The on-off operation of the switch 29 is under the control of the CPU 1. A collector terminal of the stationary-light-removal transistor 28 is connected to the negative input terminal of the operational amplifier 20 and an emitter terminal of the transistor 28 is grounded through a resistor 30.

The integrating unit 15 may be formed as described hereinafter. An integrating capacitor 6 attached externally to a $C_{INT}$ terminal of the AFIC 10 is connected through a switch 60 to the output terminal of the arithmetic unit 14 and through a switch 62 to a constant current source 63. The integrating capacitor 6 is further connected through a switch 65 to an output terminal of an operational amplifier 64 and directly to a negative input terminal of the operational amplifier 64. The potential of the capacitor is applied to the $S_{OUT}$ terminal of the AFIC 10. It is noted that these switches 60, 62 and 65 are controlled by control signals from the CPU 1 and a positive input terminal of the operational amplifier 64 is connected to a second reference power source 66.

Next, the operation of the AFIC 10 will be described with reference to FIGS. 1 and 2. The CPU 1 causes the switch 29 in the first signal processing unit 11 to be turned on when the IRED 4 is not allowed to emit infrared pulse. At this time, the stationary-light component $I_O$ output from the PSD 5 is input into the first signal processing unit 11, in which it is current amplified by a current amplifier comprising the operational amplifier 20 and the transistors 21 and 22. The stationary-light component $I_O$ is then converted to a voltage signal by a logarithmic compress with the logarithmic diode 24, and obtained voltage signal is input to the negative input terminal of the operational amplifier 23. When the signal input into the operational amplifier 20 is large enough, the cathode potential of the logarithmic diode 24 is increased. Thus, the signal output from the operational amplifier 23 is also increased and the stationary-light-removal capacitor 27 is charged. As this causes the base current to flow through the transistor 28, the collector current also flows through the transistor 28, so that a signal component, which is to be input into the operational amplifier 20, of the signal $I_0$ input into the first signal processing unit 11 is decreased. With the condition that this closed-loop operation is generally stabilized, the whole signal $I_0$ input into the first signal processing unit 11 flows through the transistor 28 and the stationary-light removal capacitor 27 is charged to a level corresponding to the value of the base current at that time.

When the CPU 1 causes the IRED 4 to emit the infrared and the switch 29 to be turned on, then the signal $(I_1+I_0)$ is output from the PSD 5. The stationary-light component $I_0$ of this signal flows as a collector current through the transistor 28, to which the base potential is applied by the electric charge stored in the stationary-light-removal capacitor 27. With respect to the "near-side" signal $I_1$, it is current amplified by the current amplifier device consisting of the operational amplifier 20 and the transistors 21 and 22. The "near-side" signal $I_1$ is then converted to a voltage signal by a logarithmic compress with the logarithmic diode 24. In other words, only the "near-side" signal $I_1$ with the stationary-light component $I_0$ being removed is output from the first signal processing unit 11 and input into the arithmetic unit 14. In the second signal processing unit 12, only the "far-side" signal $I_2$ with the stationary-light component $I_0$ being removed is output therefrom and input into the arithmetic unit 14 in a manner similar to that in the first signal processing unit 11.

Either of the "near-side" signal $I_1$ output from the first signal processing unit 11 and the "far-side" signal $I_2$ output from the second signal processing unit 12 is input into the arithmetic unit 14, in which the output ratio $I_1/(I_1+I_2)$ is calculated and from which the calculated output ratio is input into the integrating unit 15. While the IRED 4 emits the predetermined number of infrared-light pulses, the switch 60 in the integrating unit 15 is maintained on and the switches 62 and 65 are retained off so that the output ratio signal output from the arithmetic unit 14 is stored in the integrating capacitor 6. After the emission of the predetermined number of infrared-light pulses, the switches 60 and 65 are turned off and on, respectively, so that the charge stored in the integrating unit 6 is decrementally offset by the charge of inverse potential supplied through the output terminal of the operational amplified 64. The CPU 1 monitors the potential of the integrating capacitor 6 to determine a time necessary for the capacitor 6 to revert to the original potential level. The CPU 1 then seeks for the AF signal based on the determined time and further determines the distance to the object 30.

Next, the operation of the distance measurement according to the aforementioned preferred embodiment would be explained with FIG. 3 showing various timing charts by way of explanation of the operation.

When the shutter release button is half depressed, the distance-measuring procedures start. The AFIC 10 is allowed to restart furnishing the power source voltage and the switch 65 is turned on, causing the integrating capacitor 6 to be preliminarily charged to the reference voltage $V_{REF}$. During the preliminarily charging at the start of the distance measurement, the CPU 1 receives input about the power source voltage and checks or evaluates whether the voltage level is sufficient. If not so, the CPU 1 indicates that the voltage level is insufficient. Furthermore, during the preliminarily charging, the external luminance measured by the photometer 71 and the ambient temperature measured by the temperature sensor 72 are input into the CPU 1.

Alternatively, when preliminarily charging the integrating capacitor 6, it may be charged to the reference voltage $V_{REF}$ after it is once overcharged to a voltage above the reference voltage $V_{REF}$. Each of the measurement may be performed during the period of overcharging, or during the period of charging to the reference voltage, or during the period spanning both the aforesaid periods. Furthermore, each of the measurement may be performed during a period accumulating the stationary-light component $I_0$ in the standby-component-removal capacitor 27 in each of the first and second signal processing units 11 and 12.

After the completion of the preliminarily charging, the switch 65 is turned off and, as shown in FIG. 3, the IRED 4 is driven to emit the infrared-light pulses by an emission timing signal of a predetermined duty ratio output from the CPU 1 to the driver 3. The infrared pulses emitted by the IRED 4 are reflected by the object 30 and then received by the PSD 5. The arithmetic unit 14 outputs data regarding the output ratio $I_1/(I_1+I_2)$ for each pulse and the data are input into the integrating unit 15 as distance information signals. The CPU 1 controls the switch 60 at timing responsive to the pulse emission of the IRED 4 so that a negative voltage corresponding to each output ratio is applied across the integrating capacitor 6.

The integrating capacitor 6 in the integrating unit 15 receives the distance information signals output from the arithmetic unit 14 and discharges in response to the each voltage of the distance information signal. In other words, the voltage across the integrating capacitor 6 decreases step by step whenever each distance information signal is input into the capacitor (first integrating), as shown in FIG. 3. An amount of voltage drop per each step may represent by itself a piece of distance information corresponding to a distance to the object 30. However, it is understood that summation of the distance information signals is achieved in the first integrating.

After the integrating capacitor 6 has received the predetermined number of inputs equal to the number of emissions, the switch 60 is maintained off. However, the switch 62 is turned on by the signal from the CPU 1. This causes the integrating capacitor 6 to be charged at a predetermined speed determined by the power rating of the constant current source 4 (second integrating).

During the period of second integrating, a not shown comparator compares the voltage of the integrating capacitor 6 to the reference voltage $V_{REF}$ and when estimated that they are coincident with each other, causes the switch 62 to be turned off. This causes the charging of the integrating capacitor 6 to be stopped and the CPU 1 to commence determining a time required performing the second integrating. As the charging speed of the constant current source 4 is constant, the sum of the distance information signals input into the integrating capacitor 6 during one distance measurement can be determined from the time required to perform the second integrating. As the number of emissions is known, the average of measured distances can be determined based on the sum of the distance information signals.

Subsequently, the shutter release button is fully depressed and then the CPU 1 operates to control the lens drive unit 7 based on the determined distance so as to appropriately adjust the focus of the lens 8. Also, a shutter (not shown) opens causing exposure film to light. In this manner, the shutter release operation can be followed by the series of shooting procedures comprising the preliminarily charging (including the external luminance measurement, temperature measurement and power voltage check), distance measuring (first and second integrating), focussing and exposing.

It is understood from the foregoing that with the distance measurement system according to the preferred embodiment, the measurement of the external luminance and temperature and power voltage check are performed during the time period over which the preliminarily charging of the integrating capacitor 6 is carried out at the start of distance measurement operation. Thus, a time lag can be shortened until the time when the exposure film to light ends after the start of the shutter release button manipulation.

Figure 4A:
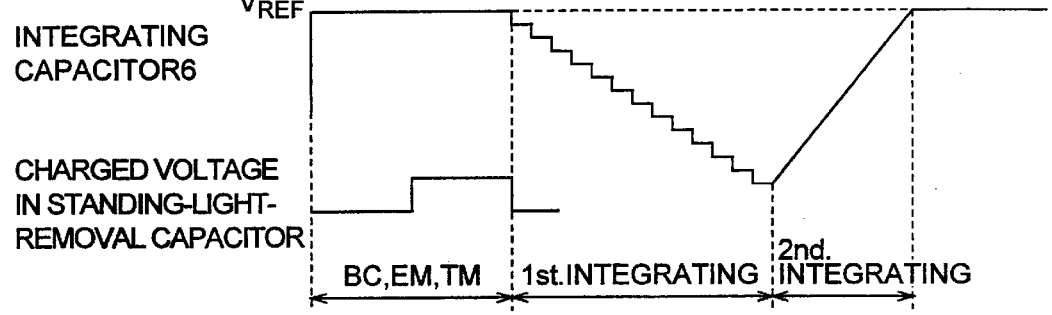
FIGS. 4A to 4D are timing charts for explaining different modes of the operation of the distance measurement system shown in FIG. 1.

It is noted that a period, during which these measurement and check are performed, is not limited to the aforementioned period. FIGS. 4A to 4D show timing charts for explaining different operation modes of the distance measurement system according to the preferred embodiment. More specifically, each of these figures shows variations in voltage of the integrating capacitor 6. FIG. 4A also shows variations in voltage of the stationary-light-component removal capacitor 27. However, the timing chart of variations in voltage of the stationary-light-component removal capacitor 27 is omitted from FIGS. 4B to 4D, as it is similar to that of FIG. 4A.

The timing chart shown in FIG. 4A is the same as that shown in FIG. 3. More specifically, the integrating capacitor 6 is preliminarily charged to the reference voltage $V_{REF}$ before the first integrating, and the external luminance measurement (EM), temperature measurement (TM) and power voltage or battery check (BC) are performed during the period over which the integrating capacitor 6 is preliminarily charged to the reference voltage $V_{REF}$.

Figure 4B:
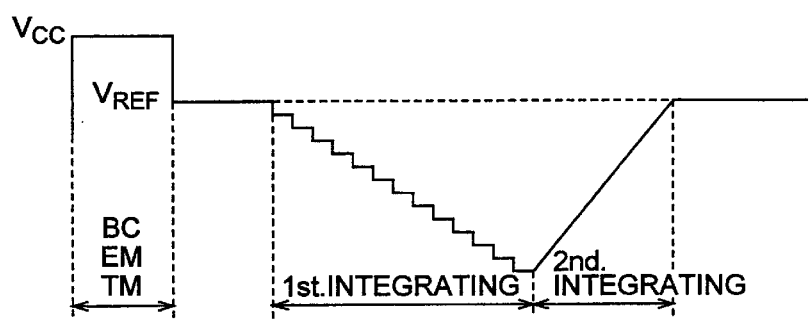

In the timing chart shown in FIG. 4B, the integrating capacitor 6 is overcharged to the power source voltage $V_{CC}$ (but $V_{REF}<V_{CC}$) and then preliminarily charged to the reference voltage $V_{REF}$. The preliminarily charging of the stationary-light-component removal capacitor 27 is performed during the period over which the integrating capacitor 6 is preliminarily charged to the reference voltage $V_{REF}$. In the timing charts of FIGS. 4C and 4D as described latter, the preliminarily charging is also performed in the similar manner. The external luminance measurement (EM), temperature measurement (TM) and power voltage or battery check (BC) are performed during the period over which the integrating capacitor 6 is overcharged to the power source voltage $V_{CC}$.

Figure 4C:
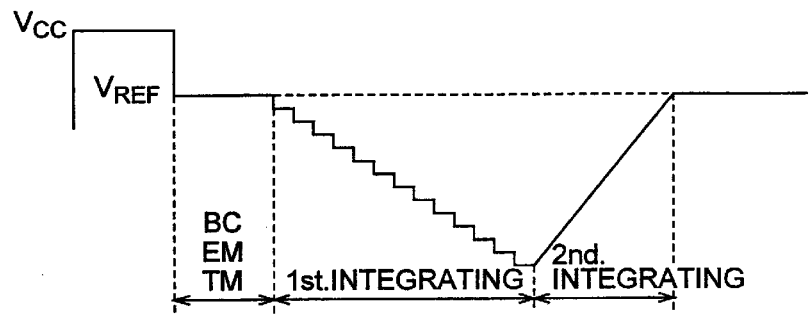

In the timing chart shown in FIG. 4C, the integrating capacitor 6 is also overcharged to the power source voltage $V_{CC}$ and then preliminarily charged to the reference voltage $V_{REF}$. The preliminarily charging of the stationary-light-component removal capacitor 27 is performed during the period over which the integrating capacitor 6 is preliminarily charged to the reference voltage $V_{REF}$. The external luminance measurement (EM), temperature measurement (TM) and power voltage or battery check (BC) are performed during the period over which the integrating capacitor 6 is preliminarily charged to the reference voltage $V_{REF}$.

Figure 4D:
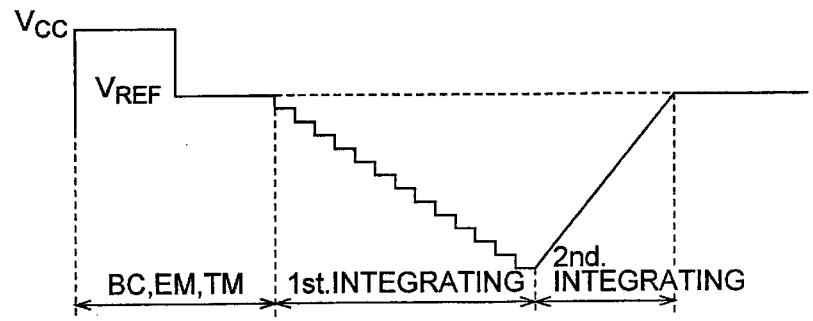

In the timing chart shown in FIG. 4D, the integrating capacitor 6 is also overcharged to the power source voltage $V_{CC}$ and then preliminarily charged to the reference voltage $V_{REF}$. The preliminarily charging of the stationary-light-component removal capacitor 27 is performed during the period over which the integrating capacitor 6 is preliminarily charged to the reference voltage $V_{REF}$. The external luminance measurement (EM), temperature measurement (TM) and power voltage or battery check (BC) are performed during the period over which the integrating capacitor 6 is overcharged to the power source voltage $V_{CC}$ or the period over which the integrating capacitor 6 is preliminarily charged to the reference voltage $V_{REF}$.

The present invention is not limited to the aforementioned embodiments and many modifications can be made thereto. For example, the invention is also applicable to a system including such an integrating unit, in which charging and discharging of an integrating capacitor are carried out in a manner contrary to that in the aforementioned embodiments. That is, during the period of the first integrating, the integrating capacitor is charged so that the voltage level thereof ascends step by step and then discharged at a time in the second integrating. The distance to the object is obtained on the basis of the time required for the second integrating in aforementioned embodiment, but it may also be obtained on the basis of the charged or discharged voltage of the integrating capacitor 2 after the first integrating with an A/D conversion.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An active distance measurement system comprising:

a light source for emitting a series of light pulses toward an object at a distance to be measured;

a position sensing detector for detecting light emitted from said light source and reflected from the object and outputting signals, each signal corresponding to a position where the reflected light pulse is detected;

an arithmetic unit for outputting signals, each signal corresponding to the distance to the object, in response to the signals output from said position sensitive detector;

an integrating capacitor set to a first reference voltage before emission of the series of light pulses, said capacitor being charged and discharged in response to signals output from said arithmetic unit;

a distance detection unit for detecting the distance to the object based on a charged voltage of said capacitor present after emission of the series of light pulses;

a measuring unit for measuring at least one parameter related to operation of said distance measuring system; and a control unit controlling said distance measurement system so that a distance measurement is actually performed by emitting the series of light pulses after said measuring unit has measured the at least one parameter, after receiving instructions to start a distance measurement.

an arithmetic unit for outputting signals, each signal corresponding to the distance to the object, in response to the signals output from said position sensitive detector;

an integrating capacitor set to a first reference voltage before emission of the series of light pulses, said capacitor being charged and discharged in response to signals output from said arithmetic unit;

a distance detection unit for detecting the distance to the object based on a charged voltage of said capacitor present after emission of the series of light pulses;

a measuring unit for measuring at least one parameter related to operation of said distance measuring system; and a control unit controlling said distance measurement system so that a distance measurement is actually performed by emitting the series of light pulses after said measuring unit has measured at least one of the power source voltage, the external luminance, and the ambient temperature after receiving instructions to start a distance measurement.

2. The distance measurement system according to claim 1, wherein said capacitor is charged to at least the first reference voltage after said control unit receives instructions to start a distance measurement and before emission of the series of light pulses.

3. The distance measurement system according to claim 1, further comprising a stationary-light-component removal capacitor connected to output terminals of said position sensitive detector to remove a stationary-light component potentially included in the signal output from said position sensitive detector, said stationary-light-component removal capacitor being set to a second reference voltage during after said control unit receives instructions to start a distance measurement and before emission of the series of light pulses.

4. The distance measurement system according to claim 1, wherein said measuring unit checks a power source voltage as the parameter related to operation of said distance measurement system.

5. The distance measurement system according to claim 1, wherein said measuring unit measures an external luminance as the parameter related to operation of said distance measuring system.

6. The distance measurement system according to claim 1, wherein said measuring unit measures ambient temperature as the parameter related to operation of said distance measuring system.

* * * * *